United States Patent [19]
Redman

[11] 3,967,121
[45] June 29, 1976

[54] LOW LEVEL INFRARED CAMERA (LLIR CAMERA)

[75] Inventor: Charles M. Redman, Las Cruces, N. Mex.

[73] Assignee: The United States of America as represented by the Secretary of the Army, Washington, D.C.

[22] Filed: Sept. 10, 1975

[21] Appl. No.: 612,054

[52] U.S. Cl. .................................................. 250/330
[51] Int. Cl.² .................. H01J 31/49; G03B 41/00
[58] Field of Search ........... 250/330, 333, 334, 338, 250/340, 342

[56] References Cited
UNITED STATES PATENTS 3,919,555 11/1975 Singer .............................. 250/330 X
3,930,157 12/1975 Watton ................................. 250/330

*Primary Examiner*—Davis L. Willis
*Attorney, Agent, or Firm*—Nathan Edelberg; Robert P. Gibson; Saul Elbaum

[57] ABSTRACT

Photon images, typically but not necessarily, in the long or infrared wavelengths are focussed upon the input face of a semiconductor plate. For an electronically controllable time input photon energy is converted to electrons free to move through a semiconductor substrate and integrated in thousands of PN diodes in the plane of the Plate. A deformographic film on the output face of the Plate is deformed according to the stored electron image. An optically reflective film is deposited over the deformographic film so that incident light from a first Schlieren Optic System scatters in accordance with the stored image and is focussed onto a further stage. The further stage includes an image intensifier which converts the scattered images to electron images, accelerates the electron images through electron optics and impacts them in an Image Storage Plate which amplifies the images and deforms a deformographic film-having an optically reflective surface. A second Schlieren Optics System converts the deformed image to an optical image and projects it onto moving film. Electronic synchronization allows the images to be recorded on moving film without distortion.

9 Claims, 8 Drawing Figures

LOW LEVEL INFRARED CAMERA (LLIR CAMERA)

RIGHTS OF THE GOVERNMENT

The invention described herein may be manufactured, used, and licensed by or for the U.S. Government for governmental purposes without the payment to me of any royalty thereon.

BACKGROUND OF THE INVENTION

1. Field of Invention

The present invention relates to a system for recording infrared images on a photographic film. More specifically, the present invention relates to a system for recording either still or motion pictures of infrared images on photographic film.

2. Description of Prior Art

There is considerable interest in the recording of infrared (IR) images for purposes of examining IR signatures of military weapons, identification of enemy weapons through photography of IR images, and study of weapons performance through examination of IR image patterns. There is also great interest in non-defense areas in the recording of IR images for purposes of collecting information concerning unlawful acts, for study and analysis of the health of farm crops and other vegetation, to aid in determining world geological features, and for the determination of problem hot spots in devices and mechanisms. The prime difficulty with most of the present techniques for recording IR images is frame rate. Present technology allows only about 16 frames per second for moderate to low IR image contrast.

SUMMARY OF THE INVENTION

Accordingly, it is an object of the present invention to provide an infrared camera of almost unlimited frame rates.

It is a further object of the present invention to provide an infrared camera which can record infrared images of fast moving objects such as aircraft or missiles.

It is still a further object of the present invention to provide an infrared camera which can efficiently record low level infrared images.

These and other objects of the present invention are fulfilled by providing a Low Level Infrared Camera (LLIR Camera) which utilizes a combination of Infrared Image Storage Plates (IRISP), Image Storage Plates (ISP), Photocathodes, Schlieren optics, standard camera optics, and film transport with constant film speed. Electronic control is utilized to set framing rate, optimize image contrast, and set time of exposure to the photon image.

The input optics to the LLIR Camera, except for spectrum, is the same as required for any camera system and must consider field of view, distance of objects, contrast of object to surrounding media, and contrast of features of the object. The spectrum, being lower than that utilized by standard camera systems, requires different optical and filter materials. The size of the optics is a function of radiation gathering power required as in standard camera systems. A telescope would be required for objects far out in space.

BRIEF DESCRIPTION OF DRAWINGS

The objects of the present invention and the attendant advantages thereof will become more readily apparent by reference to the following drawings wherein like numerals refer to like parts and the respective figures illustrate the following.

DETAILED DESCRIPTION OF PREFERRED EMBODIMENTS

Figure 6:
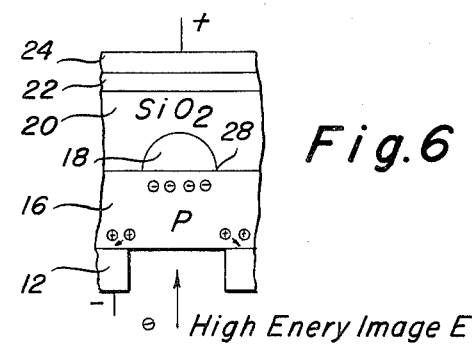
FIG. 6 is an enlarged view of a portion of the Image Storage Plate of FIG. 5.
Figure 7:
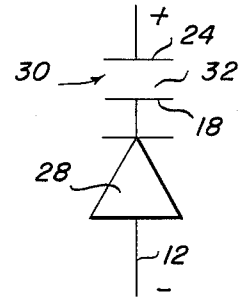
FIG. 7 is an electronic schematic or equivalent circuit of the Image Storage Plate of FIG. 5.
Figure 8:
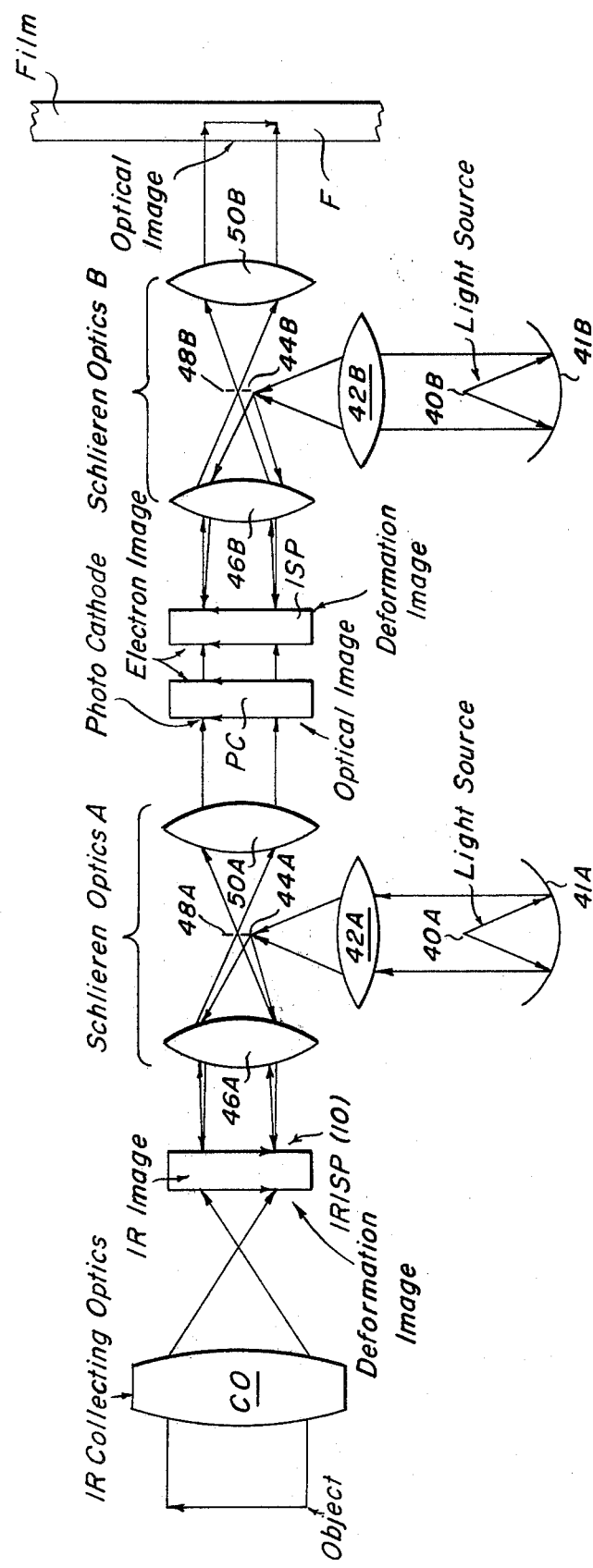
FIG. 8 is a diagramatic view of the Low Level Infrared Camera of the present invention.

The individual component parts of the Low Level Infrared Camera of the present invention are illustrated in FIGS. 1 to 7 while the camera system illustrating the combination of the component parts is illustrated in FIG. 8.

INFRARED IMAGE STORAGE PLATE

Figure 1:
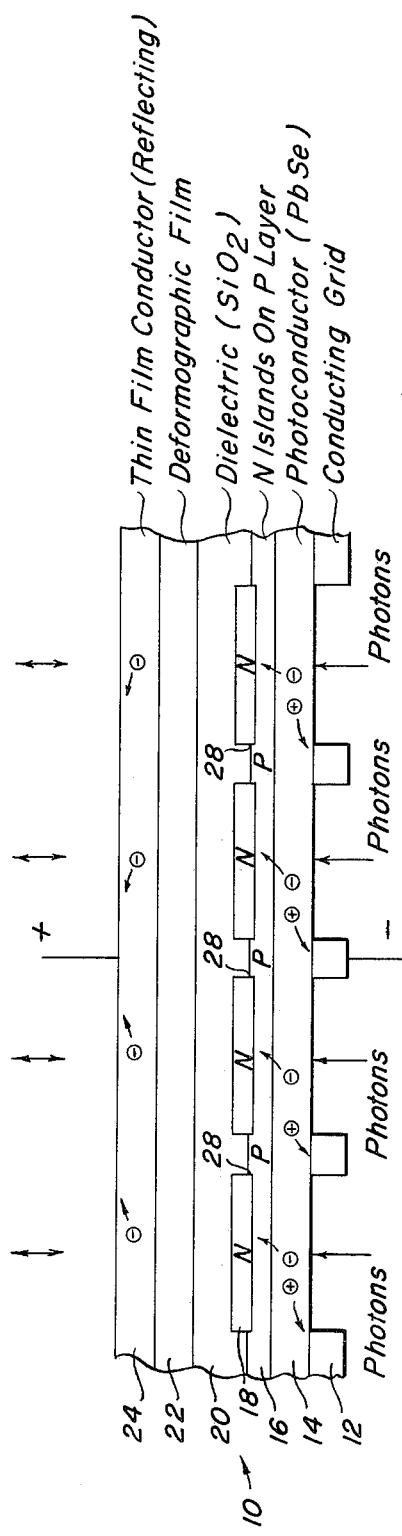
FIG. 1 is a side elevational view in section illustrating the infrared image storage plate for use in the camera of the present invention.
Figure 1:

Referring in detail to FIG. 1 there is illustrated an Infrared Image Storage Plate (IRISP) generally designated 10.

The heart of the device is a very thin plate 16 of P-type semiconductor material with N-type islands 18 grown, deposited, or formed there. Both sides of the semiconductor plate should be as flat as construction techniques will allow. The image resolution of the IRISP is directly related to the numbers of N-type islands per square cm. Television quality images would require approximately 400,000 islands per square cm. or a spacing of 63 per mm.

A thin film 14 of photoconducting material, such as PbSe, is deposited below the P-type semiconductor 16 and a fine conducting grid 12 below that. The photoconductor 14 and conducting grid 12 are disposed at the infrared image input side of the IRISP 10. Above the N-type islands 18 is a very thin film of dielectric 20 such as $SiO_2$ which is grown, deposited, or formed thereon. Disposed above dielectric 20 is deformographic film 22, such as, a polymer of rubber, for storing the infrared image in a manner to be described hereinafter. The structure is completed by a thin electrically conductive and optically reflective layer 24 disposed on top of deformographic layer 22. Layer 24 is very thin and is bonded or secured to layer 22 in such a way that it deforms with deformographic layer 22 in accordance with the stored image.

Accordingly, IRISP 10 comprises a multilayered structure sandwiched between two conductive electrodes defining its respective faces, i.e. conducting grid 12 and thin film conductor 24. An electrical biasing potential is applied across electrodes 12 and 24 with a polarity selected in accordance with the selection of a storage or erase mode of operation.

Figure 2:
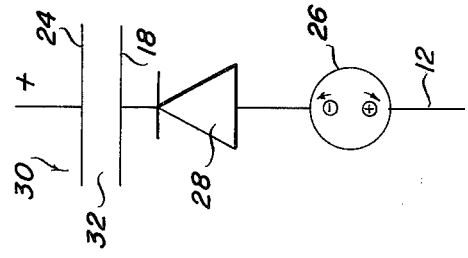
FIG. 2 is an electronic schematic or equivalent circuit of the storage plate of FIG. 1 illustrating the condition of the plate during the image storing mode.

FIGS. 1 and 2 both show a bias potential polarity suitable for use with the storage mode of operation, that is a positive potential on electrode 24 and a negative potential on electrode 12.

The storage mode of operation can be understood by reference to FIG. 2 which is an electronic schematic or equivalent circuit of the IRISP 10 biased in the manner indicated in FIG. 1.

The output face or thin film reflective conductor 24 is common to all PN elements and is one plate of the capacitor 30 shown in FIG. 2. The deformographic and dielectric films 22, 20 are also common to all PN elements and form the capacitor dielectric 32. The deformographic film 22 is a fairly good insulator but not as good as the dielectric film 20 which is $SiO_2$ in the example shown. There is a separate N-type semi-conductor island for each element forming PN diode interfaces 28 with the P-type semiconductor which is common to all PN elements. The photoconductor film 14 is also common to all PN elements and is a source of electron-hole pairs 26. The conducting grid 12 is also common to all PN elements. Only the N-type islands separate the IRISP into a large number of individual elements. The PN diodes 28 are back biased in FIGS. 1 and 2. A back biased diode PN diode functions as a capacitor whose capacitance depends on the construction and the magnitude of the biasing potential. Therefore, the equivalent circuit of FIG. 2 is two capacitors 28, 30 in series with a source of electron-hole pairs 26.

In operation photons from an infrared image striking the photoconductor 14 release electrons which migrate toward the plus potential and tend to stop at the PN interfaces between layers 16, 18. The holes migrate toward the negative side of the bias source. This unbalances the element circuit of FIG. 2 causing an equal number of electrons to go to the output face conducting film 24. The charge stored at the PN interface 28 increases and the charge in the capacitor 30 formed by the N type island 18 and thin film conductor 24 decreases. Thus, the deformographic film 22 deforms in proportion to the potential across it. This potential is in turn a function of the thicknesses of the dielectric and deformographic films, the initial charges stored, and the number of electrons generated in the photoconductor and held or stored at the PN interfaces.

Figure 3:
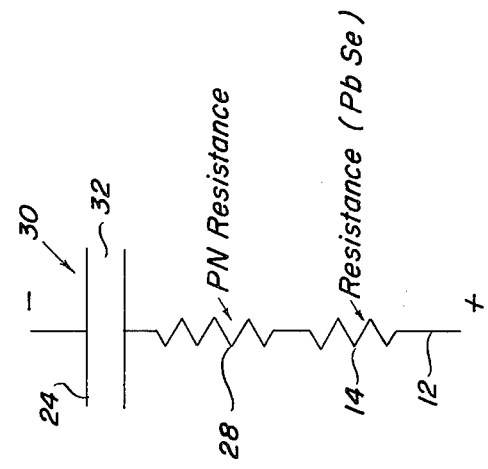
FIG. 3 is an electronic schematic or equivalent circuit of the storage plate of FIG. 1 illustrating the condition of the plate during the erasing mode.

As illustrated in FIG. 3 reversing the bias across the IRISP causes the PN interfaces 28 to become resistive instead of capacitive. The PN resistance 28 becomes almost a short circuit causing the capacitor 30 across the dielectric and deformographic films to be almost shorted across the potential source. This zeros or erases the IRISP and leaves a potential across the two films at some value which can be set to optimize the operation of the system. At this stage the photoconductor element 14 is equivalent to a resistor, as shown.

The operation of IRISP 10 for use in the camera of the present invention is thus illustrated in FIGS. 2 and 3. A typical sequence of operation is as follows:

1. A zeroing or forward bias is applied across electrodes 12, 24, as indicated in FIG. 3, to remove any existing images;

2. A reverse bias or image integrating voltage is applied across electrodes 12, 24, as indicated in FIGS. 1 and 2;

3. An infrared image of photons are caused to impinge upon photoconductor 14 thereby generating electron-hole pairs 26 which integrate across the PN junctions 28, dielectric 20, and deformographic film 22, thus storing an image in deformographic film 22; and 4. IRISP 10 is erased as in step (1) to complete the cycle.

The image stored in deformographic film 22 corresponds to the infrared image incident on photoconductor 14. It is of course only a latent image at this stage. In order to make the stored latent image visible, a Schlieren Optical Projection System is employed which will be described hereinafter with reference to FIG. 4.

SCHLIEREN OPTICAL SYSTEMS

Figure 4:
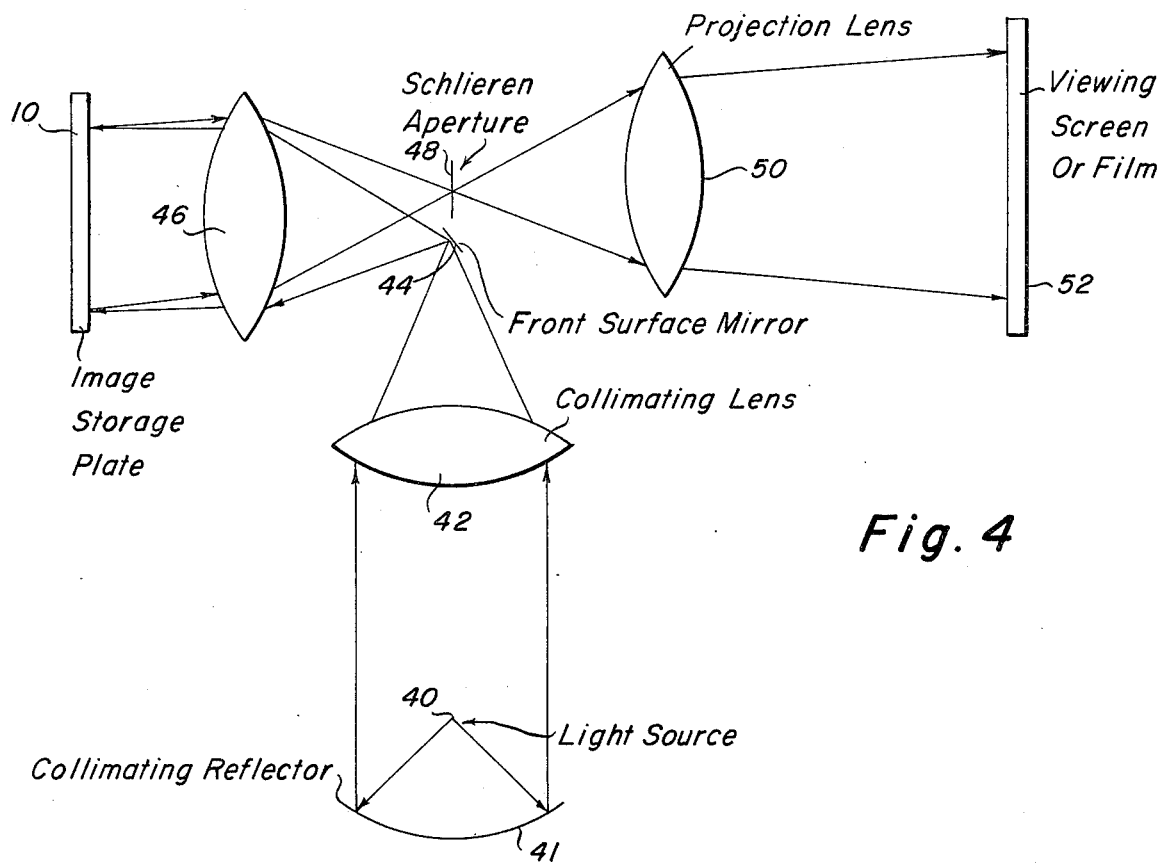
FIG. 4 is a diagramatic illustration of a projection system for projecting the image stored in the storage plate of FIG. 1.

Referring in detail to FIG. 4 there is illustrated a visible light source 40 directed toward a collimating reflector 41. Collimated light from reflector 41 is directed through a collimating lens 42 which focuses said light at a point on a mirror 44. The light reflected from mirror 44 passes through a collimating lens 46 and illuminates the stored image in deformographic film 22. Light reflected from film 22 passes back through collimating lens 46 to a pin hole or Schlieren aperture 48 at a small angle to the illumination directed toward the deformographic film. Light scattered by deformations does not pass through the pin hole 48. Therefore, the light which does pass carries an image of the deformations. This image is then projected by projection lens 50 on a screen, film, image intensifying or storage device 52, or further stages of the camera of the present invention. The contrast in the projected image is proportional to the magnitude of deformations on the deformographic film 22 which in turn is proportional to the contrast in the IR image.

The light source 40 shown in FIG. 2 can remain on continuously and the image erased and integrated as described above. The light can also be flashed on for a very short period of time to allow a framing action for changing images. This technique allows motion picture film to be made of IR images on constant motion film, as will be described hereinafter with respect to the camera of FIG. 8.

As will be described hereinafter with reference to FIG. 8, the camera of the present invention employs two Schlieren Optical Systems of the type described in FIG. 4. One Schlieren System is used for reading out the image stored in the IRISP of FIG. 1 and a second Schlieren System is used for reading out the image stored in the ISP of FIG. 5 to be described hereinafter.

IMAGE STORAGE PLATE

Figure 5:
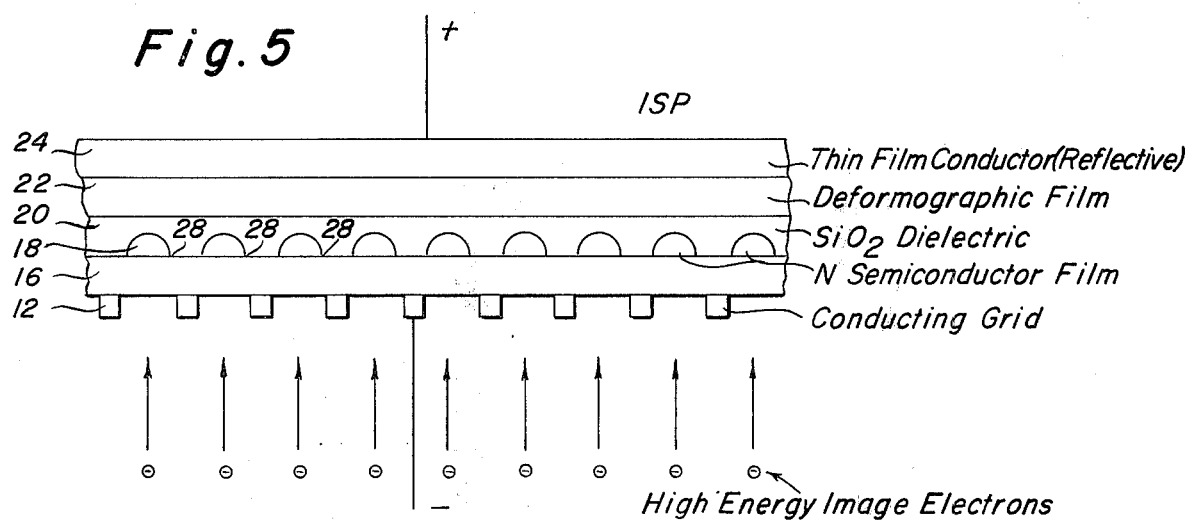
FIG. 5 is a side elevational view in section of an Electron Image Storage Plate for use in the camera of the present invention.

Referring in detail to FIG. 5 there is illustrated an Image Storage Plate ISP for use in the camera of FIG. 8 of the present invention.

The ISP of FIG. 5 is basically of the same construction as the IRISP of FIG. 1 with the exception of photoconductive layer 14. Photoconductor 14 is omitted to make the ISP sensitive to electron images instead of infrared images. The remaining layers of the multilayered structure of FIG. 5 are identical to those of FIG. 1 and bear like reference numerals.

The Image Storage Plate ISP can function as the output plate of an image intensifier. The ISP receives high energy electrons on its input side and develops an output image on deformographic film. The objective of the ISP is to allow images which have been amplified in intensity to be projected onto screens or onto recording film.

In a typical image intensifier having a photocathode, the photocathode converts the photon image to a low energy level electron image. High voltage across the image intensifier causes the electrons in the image to be accelerated to a high energy level. Electron optics causes the high energy electrons to project the same image as that of the low energy image. The output plate of the intensifier converts the high energy electron image to an optical image by means of a phosphor film. This output plate with the phosphor film is replaced with the ISP of the present invention. Each high energy electron striking the ISP causes approximately 2000 low energy electron-hole pairs in the P semiconductor film 16 in the ISP. The exact number of electron-hole pairs is a function of the Kinetic energy of the electron and the characteristics of the semiconductor. This makes available 2000 electrons for storage for each electron released from the photocathode. These stored electrons set up a charge pattern of the image in close proximity to deformographic film 22 causing it to deform to the image.

As in the structure of FIG. 1, substrate of P semiconductor material 16 is provided. N semiconductor islands 18 are then masked and grown on the substrate. Typically 50 islands per mm and 2500 islands per square mm would be sufficient, however, where higher image resolution is required a correspondingly higher density of islands is required. A dielectric $SiO_2$ film 20 is then grown over the islands. The surface of the $SiO_2$ must be smoothed to a high degree as the next layer must be smooth in its normal state. This creates 2500 PN diodes per sq mm as an example with the P side common. A conducting film 12 is then grown on the P semiconductor and then etched away so as to form a conducting grid with the P semiconductor exposed over the N semiconductor islands 18. Deformographic film 22 is then deposited on the $SiO_2$ dielectric 20. A thin film reflective conductor 24 is deposited over the deformographic film.

As shown in FIGS. 5 to 7 the ISP conducting grid 12 is connected to a negative potential with respect to the thin conductor 24 during the image integration and storage mode.

FIGS. 6 and 7 show the details of one element of the island and an equivalent circuit of said one element, respectively. Biasing as above places the PN junction 28 in a reverse bias condition. The holes generated by impacting electrons go to the conducting grid and leave the ISP. Electrons generated by the impacting electrons go to the PN interface 28 where they are stored in the capacitance at the junction. The N semiconductor islands 18 form a capacitor 30 with the thin film conductor 24 with the $SiO_2$ and deformographic layers 20, 22 forming the dielectric separation 32 as shown in FIG. 7. Impacting electrons build up the charge across the Pn diode capacitor 28 and decrease the point charge across the deformographic film 22. The deformographic film deforms in proportion to the stored charge.

The process described above is one way in that electrons are added to the P side of the PN interface but are not subtracted with a changing image. A pulse to forward bias the ISP would be normally applied at periodic intervals such as once each millisecond to discharge the PN interface and establish a reference level charge across the deformographic film.

Collimated light from a Schlieren Projection System as described in FIG. 4 reflects off the thin film 24 which has been deformed in accordance with the image stored in film 22. Due to the deformed condition, some light is scattered and does not pass through the Schlieren aperture. Light which passes through this aperture projects the image onto the screen or film described hereinafter with respect to FIG. 8.

The ISP works with most image intensifier or image converter types including the electrostatic, magnetic, and proximity focused devices and channeltron electron multiplier arrays.

LOW LEVEL INFRARED CAMERA

Referring in detail to FIG. 8 there is illustrated in detail the low level infrared camera of the present invention which can be considered to include five (5) optical stages for projecting an optical image on a constant motion film F.

The first stage includes the input optics of the camera i.e. an infrared collecting lens CO for imaging the infrared radiation emitted from the object to be photographed. Any suitable input optics may be used without departing from the spirit and scope of the present invention.

The second stage of the camera is the IRISP of FIGS. 1 to 3 described hereinbefore which converts the IR image emerging from lens CO and impinging on its input face to a deformation image on its output face.

The third stage of the camera is a first Schlieren Optical system A. System A has the same basic components as the Schlieren System of FIG. 4. The components of FIG. 8 are labeled with corresponding numerals to those of FIG. 4 with the addition of the suffix A. Accordingly, reference may be made to the Schlieren System of FIG. 4 for the operation of the Schlieren System A of FIG. 8.

Schlieren Optical System A illuminates the deformation image on the output IRISP and optically projects it onto the input face of the fourth stage, which includes a photocathode and an Image Storage Plate (ISP). The light source 40A in Schlieren System A is electronically controllable as to time on and intensity. A very short intense pulse of light would normally be used to relay the intensity of deformations on the deformographic film onto the input to the ISP just prior to the rezeroing or erasing of the second stage image (IRISP) and initiation of the integration of a new image.

The fourth stage, i.e. the photocathode PC and the, (ISP), converts the optical image input to an electron image through the photocathode and amplifies the image intensity through acceleration through a high potential and converting each electron in the image to many low energy electrons for storage in the ISP.

As discussed above with reference to FIGS. 5 to 7 the ISP receives a highly accelerated electron image from photocathode PC, converts it to a static charge image with many more electrons, and correspondingly deforms a deformographic output film. Accordingly, the ISP intensifies or amplifies the deformographic image stored in the IRISP of the second stage of the camera.

The fifth stage of the camera is a second Schlieren Optical System B to project the ISP deformographic image onto moving film. The numerals of optical system B have been assigned the suffix B to indicate the correspondence of components with the Schlieren System A of the third stage.

The optical or visible light image reflected from the output face of the ISP is projected onto a constant motion film F by Schlieren Optics B to thereby record a facsimile of the original IR image thereon.

The film drive mechanism is much simplified from standard moving picture cameras. Since the preceding stages offer full control over the image there is no need for pin registering or a stop-expose-start feature. The film, therefore, is moved at a constant speed according to the frame per sec. requirements.

Timing of the LLIR Camera can vary greatly according to the desired results. The IRISP integrates the IR image according to the duration of an electronically selected pulse. Typically this might be 1.8ms where the IR image is changing rapidly. At the end of the integrating pulse the light source 40A in the first Schlieren Optical System A is turned on to transfer the image on the IRISP deformographic film to the photocathode PC where it is converted to an electron image, accelerated to a high kinetic energy electron image, impacted on the input to the ISP and stored on the diode plate and deformographic film. The image on the IRISP is then erased and made ready to integrate a new image. The image stored on the ISP diode plate and deformographic film can be held for up to 1.8ms if desired. At some electronically selectable but fixed time after the image is stored in the ISP and prior to arrival of the next image the lamp in the second Schlieren Optical System B is flashed for 2 microseconds or less to expose the recording film. An exposure time of less than 2 microseconds insures that image smear due to the moving film is held to less than 0.1 percent. The above timing sequence gives a frame rate of 500 per second. For IR images which change less rapidly a lower frame rate and longer IRISP integration time and, therefore, greater sensitivity would be allowable.

The IRISP and ISP are very small devices, a fraction of an inch thick and one square inch in area more or less, depending on desired resolution and image quality. These devices may or may not be the same size as the recording film. The second Schlieren Optical System B can be designed to project almost any size image on film. The photocathode width and spacing between it and the ISP can also be a fraction of an inch where proximity focusing of the electron image is used. The total size of the LLIR Camera would nominally correspond in size with the corresponding standard pin registered camera. The two schlieren optic systems need not be large but would be substantially longer than the IRISP and ISP.

I wish it to be understood that I do not desire to be limited to the exact details of construction shown and described, for obvious modifications can be made by a person skilled in the art.

What is claimed is:

1. A camera for recording low level infrared images comprising:
    input optic means for receiving infrared radiation from an object and forming an infrared image of said object;
    first storage plate means for receiving said infrared image at an input face thereof and storing said image on a deformographic film on an output face thereof;
    first Schlieren optic means for converting said image on the deformographic film of said first storage plate means to a first visible light image;
    photocathode means for converting said first visible light image to a corresponding electron image;
    second storage plate means for receiving said electron image on an input face thereof and storing an image corresponding to said electron image on a deformographic film on an output face thereof; and
    second Schlieren optic means for converting said image on the deforomographic film of said second storage plate to a second visible light image and projecting said second visible light image onto a photographic film.

2. The camera of claim 1 wherein said first storage plate means includes a multilayered structure having an input face for receiving incident radiation images and an output face from which the stored images may be read out, said multilayered structure comprising;
    a first electrically conductive electrode defining said input face;
    means formed on said first electrode for forming electron-hole pairs in response to the receipt of said incident radiation images;
    a semiconductor element including a continuous P-type material facing said first electrode and a plurality of N-type islands thereon facing away from said first electrode, the interfaces between said P and N-type materials storing charge in response to the formation of electron-hole pairs;
    a dielectric coating covering said N-type islands;
    a deformographic film overlying said dielectric coating, said film deforming in response to electrical charge levels stored at the interfaces of said P and N-type materials;
    a second electrically conductive electrode overlying said deformographic film and defining the output face of said multilayered structure; and
    means for applying an electrical potential across said first and second electrodes.

3. The camera of claim 2 wherein said first electrode is an electrically conductive grid structure.

4. The camera of claim 2 wherein said means for forming electron-hole pairs comprises a layer of photoconductive material between said first electrode and said semiconductor element.

5. The camera of claim 4 wherein said photoconductive material is PbSe.

6. The camera of claim 2 wherein said second electrode is a very thin conductive and optically reflective material and is secured to said deformographic film in such a manner as to deform therewith in accordance with the image stored in said film.

7. The camera of claim 1 wherein said second storage plate means a multilayered structure having an input face for receiving incident radiation images and an output face from which the stored images may be read out, said multilayered structure comprising:
    a first electrically conductive electrode defining said input face;
    a semiconductor element including a continuous P-type material facing said first electrode and a plurality of N-type islands thereon facing away from said first electrode, the interfaces between said P and N-type materials storing charge in response to the formation of electron-hole pairs in said P-type material in response to receipt of an electron image from said photocathode;

a dielectric coating covering said N-type islands;

a deformographic film overlying said dielectric coating, said film deforming in response to electrical charge levels stored at the interfaces of said P and N-type materials;

a second electrically conductive electrode overlying said deformographic film and defining the output face of said multilayered structure; and means for applying an electrical potential across said first and second electrodes.

8. The camera of claim 7 wherein said first electrode is an electrically conductive grid structure.

9. The camera of claim 7 wherein said second electrode is a very thin conductive and optically reflective material and is secured to said deformographic film in such a manner as to deform therewith in accordance with the image stored in said film.

* * * * *